United States Patent [19]

Kaiser

[11] 3,711,760
[45] Jan. 16, 1973

[54] RECTIFIER-TRANSFORMER SYSTEM
[75] Inventor: Francis D. Kaiser, Sharon, Pa.
[73] Assignee: Westinghouse Electric Corporation, Pittsburgh, Pa.
[22] Filed: June 30, 1971
[21] Appl. No.: 158,434

[52] U.S. Cl............................321/5, 321/9 R, 321/57, 336/5, 336/12
[51] Int. Cl.......................H02m 7/00, H01f 33/00
[58] Field of Search..............321/5, 8 C, 9 R, 26, 57; 336/5, 12

[56] References Cited

UNITED STATES PATENTS

| 1,412,782 | 4/1922 | Dwyer | 336/5 |
| 3,290,578 | 12/1966 | Ainsworth | 321/9 R |
| 3,465,272 | 9/1969 | Bach | 336/12 |

FOREIGN PATENTS OR APPLICATIONS

| 196,015 | 11/1956 | Austria | 321/26 |
| 1,346,558 | 11/1963 | France | 336/12 |

Primary Examiner—William H. Beha, Jr.
Attorney—A. T. Stratton et al.

[57] ABSTRACT

Electrical inductive apparatus for supplying polyphase power to a polyphase rectifier. Two six-phase transformers are interconnected with their primary windings in parallel circuit relationship. Tertiary windings on each transformer are interconnected and connected to a harmonic filter. Multiple secondaries furnish twelve-phase power to a rectifying unit. The secondary winding bus conductors and the secondary bushing terminals may be arranged so that adjacent conducting elements carry currents which are antiphase to reduce eddy currents and inductive heating.

4 Claims, 2 Drawing Figures

RECTIFIER-TRANSFORMER SYSTEM

BACKGROUND OF THE INVENTION

1. Field of the Invention

This invention relates, in general, to electrical inductive apparatus and, more specifically, to twelve-phase rectifier transformers.

2. Description of the Prior Art

High-power direct current is required for various industrial applications, such as metal reduction. Since most power sources supply alternating currents, a rectifying means must be used at the industrial site to convert the alternating current to direct current. Solid state rectifying elements are continually being developed with increased efficiency and current handling capabilities. Rotary electrical converters are gradually being replaced by solid state rectifying elements which are connected in a rectifying circuit to a transformer which transforms the value of the source voltage to a value suitable for rectification.

Since the load of the rectifying circuit on the transformer secondaries produces a load current which is not sinusoidal, harmonic currents are generated in the transformer. These harmonics are transferred to the power source line if some means is not used to attenuate them. Harmonics may create disturbances in communication systems by electromagnetic and/or electric induction, as well as exciting inductive and capacitive portions of the power transmission system to series resonance, thus creating large harmonic currents and overloading the system. Conventional rectifier apparatus has harmonic filters connected to the primary windings on the source side of the rectifier transformer to shunt the harmonic currents to ground. This provides effective attenuation of the harmonics but it also places certain limitations on the system and the apparatus. The harmonic filters must be capable of safely handling the high line voltages involved when connected directly to the source side of the transformer. It is desirable, and it is an object of this invention, to provide a rectifier transformer which can be connected to filters which may be constructed to safely handle lower voltages.

The number of harmonics and their frequency depends largely on the number of transformer phases used in rectifying circuit. For six-phase transformers, the harmonics which usually need to be filtered are the fifth, seventh, eleventh, thirteenth, seventeenth, nineteenth, twenty-third and twenty-fifth. The physical size of the filters is dictated mainly by the lower order harmonics, such as the fifth and seventh. It is desirable, and it is another object of this invention, to provide a rectifier transformer which requires only a minimum amount of filtering of the fifth and seventh harmonics.

Rectifier transformers usually operate at high current levels which may introduce additional losses into the transformer due to eddy current and induction heating losses in structures which are adjacent to the high-current secondary connections in the transformer. Similar losses may exist in relation to the current flowing through the secondary bushing. It is desirable, and it is still another object of this invention, to provide a high-current transformer which has its secondary conductors arranged in such a manner as to reduce the electric field effects of the large currents flowing within the transformer and through the bushings.

SUMMARY OF THE INVENTION

This invention teaches a new and useful arrangement for providing a polyphase transformer suitable for connection to a high-current rectifier. Two six-phase transformers, each having a primary winding, a tertiary winding, and two secondary windings, are interconnected to provide twelve-phase operation. The primary winding of one transformer is delta-connected and interconnected with the wye-connected primary of the other transformer. The two primaries are connected to a source of A.C. power. The tertiary winding of one transformer is wye-connected and interconnected with the delta-connected tertiary winding of the other transformer. The two tertiary windings are connected to a harmonic filter. Since the primary-tertiary turns ratio may be selected to provide a predetermined voltage on the harmonic filters, the harmonic filters may be operated at a lower voltage than the line source. In addition, the filters are not required to filter the fifth, seventh, seventeenth and nineteenth harmonic currents because these harmonics in each transformer are antiphase and cancel each other in the parallel connection. Thus, the filters may be constructed more economically and are substantially reduced in size.

The bus conductors, which the secondary coil sections are attached to, are arranged within the transformer casing so that the bus conductors which carry currents that are 180° out of phase are adjacent to each other. This reduces the effects of the electric fields which surround the bus conductors and improves the efficiency of the transformer. The bushing terminals are similarly arranged to reduce induction heating in the transformer casing.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENT

Figure 1:
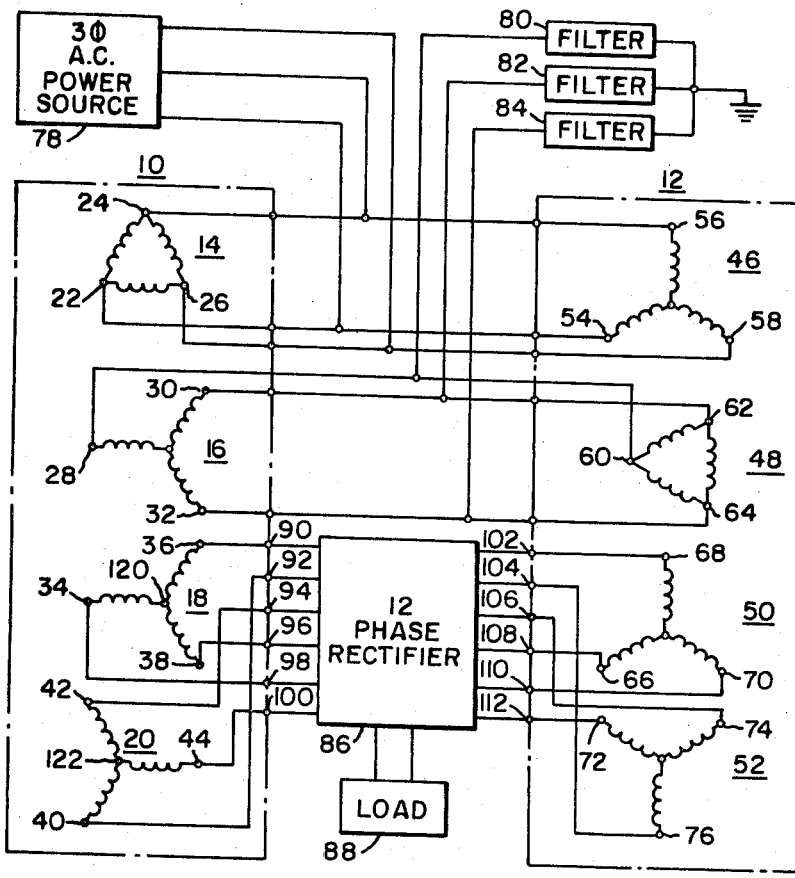
FIG. 1 is a schematic diagram illustrating the electrical connections of a transformer for providing twelve-phase output according to the teachings of this invention.

Throughout the following description, similar reference characters refer to similar members in all figures of the drawing.

Referring now to the drawing, and FIG. 1 in particular, there is shown an arrangement for supplying twelve-phase A.C. power to a rectifier system. The arrangement uses the six-phase transformers 10 and 12 which are interconnected to each other in a particular manner. The transformer 10 includes the primary winding 14, the tertiary winding 16, and the secondary windings 18 and 20. All four of the windings of the six-phase transformer 10 are magnetically coupled to a common magnetic core which is not illustrated. The primary winding 14 is delta-connected between the phase terminals 22, 24 and 26. The tertiary winding 16 is wye-connected between the phase terminals 28, 30 and 32. The secondary winding 18 is wye-connected between the phase terminals 34, 36 and 38 and the secondary winding 20 is wye-connected between the phase terminals 40, 42 and 44.

The transformer 12 includes the primary winding 46, the tertiary winding 48, and the secondary windings 50 and 52. All four of the windings of the six-phase transformer 12 are magnetically coupled to a common magnetically core which is not illustrated. The primary winding 46 is wye-connected between the phase terminals 54, 56 and 58. The tertiary winding 48 is delta-connected between the phase terminals 60, 62, and 64. The secondary winding 50 is wye-connected between the phase terminals 66, 68 and 70 and the secondary winding 52 is wye-connected between the phase terminals 72, 74 and 76.

The respective windings for the transformers 10 and 12 have the relative phase relationship indicated in FIG. 1 by the relative position of the phase terminals. For example, the voltage developed between the phase terminals 22 and 24 is 30° out of phase with the voltage developed between the phase terminals 28 and 30.

The primary windings 14 and 46 are interconnected as shown and are connected to a three-phase alternating current power source 78. The tertiary windings 16 and 48 are interconnected as shown and are connected to the filters 80, 82 and 84. The phase shift between the respective terminals of the windings 14 and 16 is 30°. A similar phase shift exists between the respective terminals of the windings 46 and 48. Since zero phase displacement exists between the tertiary windings 16 and 48, the fifth, seventh, seventeenth and nineteenth harmonics from each six-phase transformer are anti-phase and theoretically cancel each other. The eleventh, thirteenth, twenty-third and twenty-fifth harmonics, which exist in twelve-phase rectifier systems, are filtered by the filters 80, 82 and 84.

Each filter may contain inductive and capacitive elements which allow the harmonic currents to flow in a three phase low impedance filter network and limit harmonic voltage in the A.C. power source. Since the fifth, seventh, seventeenth and nineteenth harmonics substantially cancel due to the tertiary winding interconnection arrangement, the filters 80, 82 and 84 are not required to contain elements for filtering these harmonics. This allows a significant reduction in the size, weight and cost of the filters since the lower order harmonics, that is the fifth and seventh, require larger reactive components in the filter network.

An additional advantage is realized by the connection of the filters 80, 82 and 84 to the tertiary windings rather than to the primary windings. A standard filter may be used for different line voltages since the tertiary winding may have a selected turns ratio which gives it a standard voltage irregardless of the primary voltage. Having a filter voltage standard not only allows standardization of the filter apparatus, but permits optimun use of the filter. Reactive components for such filters are most efficient at specified voltage and current ratings, therefore, by selecting a suitable value for the voltage standard, the losses of the filter may be minimized.

A still further advantage exist in the ability to switch additional rectifier units into or out of the power source circuit without causing an unbalanced condition. In applications involving several twelve-phase transformer rectifier units which are connected in parallel, de-energizing a unit may be necessary if it becomes faulty. If the filters are connected to the source circuit in normal operation, they would normally remain connected to the source circuit when the unit is de-energized, thus providing an unbalanced load on the source circuit. By connecting the filters to the tertiary windings, they are effectively in the circuit only when the transformer is energized.

A phase displacement of 30° exists between the primary winding 14 and the secondary winding 18. The secondary winding 20 has a phase displacement of 180° from the secondary winding 18 due to the placement of the windings on the magnetic core. The primary winding 46 has zero phase displacement with the secondary winding 50 and 180° phase displacement with the secondary winding 52. Since each phase of the secondary windings 18, 20, 50 and 52 are displaced from another phase by at least 30°, the resulting output may be connected to provide twelve-phase operation.

The twelve-phase rectifier 86 may be an electronic rectifying circuit or other means for converting twelve-phase power to D.C. power. The D.C. power is applied to a load 88 which normally demands a large supply of direct current. The high currents required to supply the rectifier 86 are carried by conductors which are connected to the bushing terminals on the casings of the transformers 10 and 12. The bushing terminals 90 and 92 provide a current path between the terminals 36 and 40, respectively, and the rectifier 86. Since the phase terminals 36 and 40 have 180° phase displacement, the currents being conducted by the bushing terminals are 180° out of phase. Thus, when a current is flowing inwardly in one bushing terminal, an equal current is flowing outwardly in the other bushing terminal, provided the load is balanced. A similar condition exists at the bushing terminals 94 and 96, 98 and 100, 102 and 104, 106 and 108, and 110 and 112. This connecting arrangement permits more efficient bushing use and less induction heating losses because the currents at adjacent terminals are 180° out of phase and their electric fields substantially cancel each other.

Figure 2:
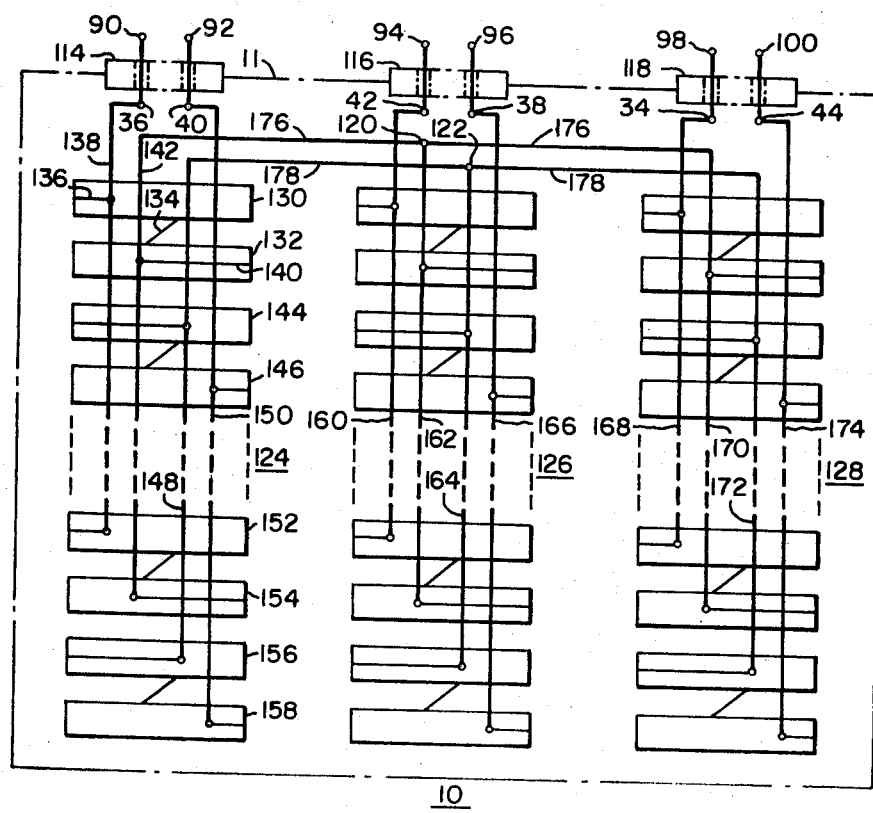
FIG. 2 is a schematic diagram illustrating the electrical and mechanical bus conductor arrangements taught by this invention.

FIG. 2 is a schematic diagram illustrating physical and electrical arrangements which may be employed to conduct 180° out of phase currents to the bushing terminal pairs. Although described in reference to the six-phase transformer 10 which is shown in FIG. 1, the description applies equally to the six-phase transformer 12 which is also shown in FIG. 1.

The casing 11 of the transformer 10 provides a mounting surface for the bushings 114, 116 and 118 and encloses the magnetic core and winding assemblies. Although not shown, the magnetic core may be of the three-legged type. The winding assemblies 124, 126 and 128 are positioned in inductive relationship with the core legs. The primary and tertiary winding assemblies which are shown in FIG. 1 are omitted from FIG. 2 for clarity.

The winding assemblies 124, 126 and 128 are positioned on a separate core leg. Each winding assembly comprises a plurality of pancake or disk coils which are inductively coupled to the same core leg. Although proper operation may be acquired with the use of only four disk coils per core leg, FIG. 2 illustrates eight disk coils per core leg to indicate the arrangement when more than the minimum number of disks are used.

The coil disks 130 and 132 are interconnected by the start-start connection 134. The finish turn 136 of the coil disk 130 is connected to the bus conductor 138 which is connected to the phase terminal 36. The bus conductor 138 is positioned near the outside of the winding assembly 124 and extends in a direction which is substantially parallel to the axis of the winding assembly. The finish turn 140 of the coil disk 132 is connected to the bus conductor 142 which is positioned substantially parallel and adjacent to the bus conductor 138. Although a satisfactory phase relationship would be obtained by connecting the start turn of the coil disk 130 to the bus conductor 142, the coil disk 132 is serially connected to the coil disk 130 so that the connection may be conveniently made with a finish turn. Additional coil disks may be serially interconnected to increase the voltage of the phase winding.

The coil disks 144 and 146 have their finish turns connected to the bus conductors 148 and 150, respectively. The bus conductors 148 and 150 are positioned near the outside of the winding assembly 124 and extend in a direction which is substantially parallel to the axis of the winding assembly 124. The bus conductor 150 is connected to the phase terminal 40 which is adjacent to the phase terminal 36.

The bus conductors 138, 142, 148 and 150 may be constructed of flat bars with the flat side of the bar facing its adjacent bar, although other shapes may be used. Due to the polarity of the coil disk connections, the currents flowing across the phase terminals 36 and 40 are 180° out of phase. Consequently, the currents flowing through the bushing 114 to the terminals 90 and 92 are 180° out of phase. Additional coil disks may be connected to the bus conductors 138, 142, 148 and 150, in parallel circuit relationship, to provide adequate current capacity. The coil disks 152, 154, 156 and 158 are connected in this manner and others may be similarly connected without departing from the scope of the invention.

The bus conductors 160, 162, 164 and 166 are similarly connected to the coil disks of the winding assembly 126. The bus conductors 168, 170, 172 and 174 are also similarly connected to the coil disks of the winding assembly 128. The currents in the bushing 116, which may flow from the phase terminal 42 to the terminal 94 and from the phase terminal 38 to the terminal 96, are 180° out of phase. A similar condition exists for the terminals 34, 98, 44 and 100 of the bushing 118.

The bus conductors 142, 162 and 170 are electrically connected at the terminal 120 to form the neutral terminal of the wye-connected secondary winding 18 as illustrated electrically in FIG. 1. The bus conductors 148, 164 and 172 are electrically connected to the terminal 122 to form the neutral terminal of the wye-connected secondary winding 20 as illustrated in FIG. 1. The bus conductors 176 and 178 which form the neutral connections may be constructed similar to the other bus conductors and are positioned adjacent to each other. The bus conductor pairs, which are formed by the bus conductors 160 and 162, and 164 and 166, 168 and 170, and 172 and 174, are electrically connected in a manner similar to the bus conductor pairs associated with the winding assembly 124.

By positioning the bus conductors adjacent each other to form bus conductor pairs which carry currents that are 180° out of phase, eddy current and induction heating losses in the bus conductors and the adjacent structural parts are reduced. A similar reduction of losses occurs in the bushings. Since the magnitude of current may be as high as 20,000 amperes, eddy current and induction heating losses are a major consideration in high power rectifier transformers.

Since numerous changes may be made in the above described apparatus and different embodiments of the invention may be made without departing from the spirit thereof, it is intended that all of the matter contained in the foregoing description or shown in the accompanying drawings shall be interpreted as illustrative rather than limiting.

I claim as my invention:

1. Six-phase transformer apparatus comprising housing means, a magnetic core having three legs, three high-current bushings each with first and second terminals, said bushings being attached to said housing means, primary winding assemblies, first, second and third secondary winding assemblies each disposed in inductive relationship with one of said core legs, bus conductors positioned in pairs adjacent to the outside of each secondary assembly, a first bus conductor pair connected to a first phase winding of said first secondary winding assembly, a second bus conductor pair connected to a second phase winding of said first secondary winding assembly, a third bus conductor pair connected to a third phase winding of said second secondary winding assembly, a fourth bus conductor pair connected to a fourth phase winding of said second secondary winding assembly, a fifth bus conductor pair connected to a fifth phase winding of said third secondary winding assembly, a sixth bus conductor pair connected to a sixth phase winding of said third secondary winding assembly, said first, third and fifth bus conductor pairs each having one of their bus conductors connected to each other to form the neutral connection of a first three-phase wye-connected secondary, the other bus conductor of each of said first, third and fifth bus conductor pairs being connected to a first terminal on each of said bushings, said second, fourth and sixth bus conductor pairs each having one of their bus conductors connected to each other to form a neutral connection of a second three-phase wye-connected secondary, the other bus conductor of each of said second, fourth and sixth bus conductor pairs being connected to the second terminal on each of said bushings, and means for connecting adjacent bushing terminals on the same bushing to bus conductors which conduct currents that are substantially 180° out of phase with each other.

2. The six-phase transformer apparatus of claim 1 including first, second and third tertiary winding assemblies each disposed in inductive relationship with one of the core legs, and means for selectively connecting said tertiary winding assemblies to tertiary winding assemblies of a similar transformer.

3. Twelve-phase transformer apparatus comprising first and second six-phase transformers, said first six-phase transformer comprising a delta-connected primary winding, a wye-connected tertiary winding, first and second wye-connected secondary windings, said second six-phase transformer comprising a wye-connected primary winding, a delta-connected tertiary winding, first and second wye-connected secondary windings, means for connecting the primary windings of said first and second six-phase transformers in parallel circuit relationship and to a source of electrical power, means for connecting the tertiary windings of said first and second six-phase transformers in parallel circuit relationship and to filter means, and means for connecting the secondary windings of said first and second six-phase transformers to rectifying means, said first and second six-phase transformers each being constructed according to the six-phase transformer of claim 2.

4. Twelve-phase transformer apparatus comprising first and second six-phase transformers, said first six-phase transformer comprising a delta-connected primary winding, a wye-connected tertiary winding, first and second wye-connected secondary windings, said second six phase transformer comprising a wye-connected primary winding, a delta-connected tertiary winding, first and second wye-connected secondary windings, means for connecting said primary windings of said first and second six-phase transformers in parallel circuit relationship and to a source of electrical power, means for connecting said tertiary windings of said first and second six-phase transformers in parallel circuit relationship and to filter means, and means for connecting said secondary windings of said first and second six-phase transformers to rectifying means.

* * * * *